March 31, 1953 H. C. BRADLEY 2,633,393
DOUBLE FLOW LUBRICATED UNIT BEARING
Filed May 31, 1950
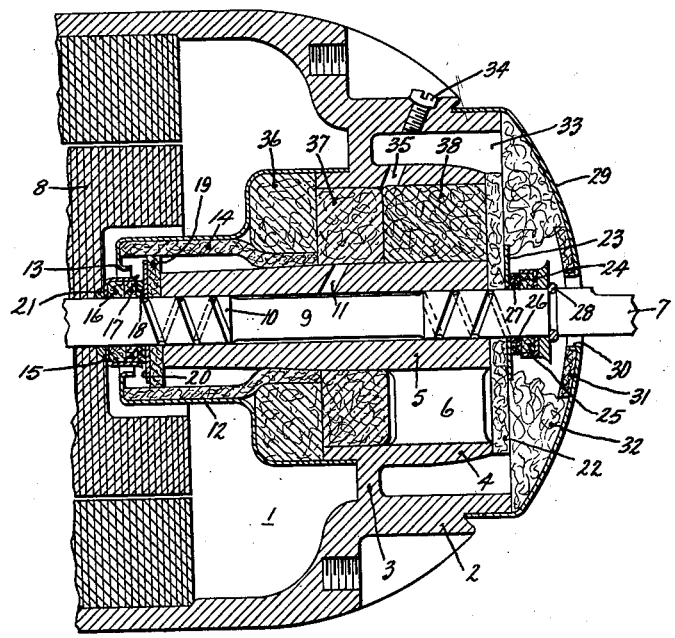
Inventor:
Harl C. Bradley,
by Ernest C. Britton
His Attorney.

Patented Mar. 31, 1953

2,633,393

UNITED STATES PATENT OFFICE 2,633,393

DOUBLE FLOW LUBRICATED UNIT BEARING

Harl C. Bradley, Fort Wayne, Ind., assignor to General Electric Company, a corporation of New York Application May 31, 1950, Serial No. 165,160

3 Claims. (Cl. 308—132)

My invention relates to improved unit-type supporting and bearing constructions for rotating machines, and more particularly to a double flow lubricated bearing for such constructions permitting operation of such machines in any position.

Dynamoelectric machines, particularly those developing fractional horsepower output, frequently have a single bearing construction. Since this type of bearing necessitates an unusually long bearing surface for adequate support of the rotating parts, some means of pumping lubrication is required properly to lubricate the bearing surfaces. Certain of these machines are operated with both ends of the shaft available for attachment to a load so that it is necessary to provide lubrication to the bearing that allows both ends of the shaft to protrude from the enclosure of the machine.

An object of my invention is to provide an improved support for unit bearing rotating machines allowing freedom for external attachment of both ends of the shaft.

Another object of this invention is to provide an improved supporting and lubrication arrangement for a unit bearing rotating machine.

Further objects and advantages of this invention will be apparent and the invention will be better understood from the accompanying drawing and the description of the drawing following.

In accordance with my invention, a unit bearing is provided in a dynamoelectric machine allowing both ends of the shaft free for external attachment. Wick material surrounds the outside of the bearing and lubricant is fed to the wick from a reservoir. The lubricant proceeds by capillary action of the wick to both ends of the bearing from which it is pumped to an undercut center section of the journal surface by the action of a pair of pumping grooves on the shaft. An orifice through the bearing wall communicating from the undercut section to the surrounding wick assures a continuous double flow of lubricant between the ends and the center of the bearing when the machine is rotating.

The single figure of the accompanying drawing is a sectional view of a unit bearing motor built according to my invention.

According to the drawing, the stator 1 of a dynamoelectric machine has a portion 2 provided with a cylindrical bore. A web 3 is connected between portion 2 and an inner portion 4 having a cylindrical bore, and forms with portions 2 and 4 an annular cavity open at one end. A unit bearing 5 is mounted upon ribs 6 supported by inner portion 4. A shaft 7 rotatable in bearing 5 is secured to rotor core 8, and within bearing 5 an undercut section 9 of shaft 7 is flanked by journal sections 10. A pair of oppositely spiraled lubricant pumping grooves are provided in the surfaces of sections 10 extending from beyond the ends of bearing 5 and communicating into section 9. An orifice 11 through the wall of bearing 5 communicates into section 9.

A retaining member 12 secured to member 4 extends beyond the end of bearing 5 and is provided with a re-entrant flange 13. A cylindrical liner 14 of wick material is positioned within member 12 and extends around bearing 5. A cup washer 15 adjacent core 8 encloses a cushion washer 16 and a thrust washer 17 which together with a cushion washer 18 retain a felt washer 19 backed by a steel stiffening washer 20 against one end of bearing 5. Washer 19 contacts liner 14 and the surface of shaft 7. A neoprene ring 21 provides an oil seal for washer 15.

A felt washer 22 retained against the opposite end of bearing 5 encloses the bore of member 4. Washer 22 contacts the surface of shaft 7 and is provided with a steel stiffening washer 23. A cup washer 24 encloses a cushion washer 25 and a thrust washer 26 which together with a cushion washer 27 retain washer 22 against bearing 5. Cup washer 24 is retained in position by a snap ring 28 fitting into a depression in shaft 7.

An end shield 29 secured to portion 2 is provided with a re-entrant flange 30 fitting around shaft 7. A felt washer 31 is positioned around flange 30. A lining 32 of wick material in end shield 29 encloses the annular cavity between portions 2 and 4 to form a lubrication reservoir 33. Reservoir 33 is provided with a threaded inlet orifice with a stopper 34 through the wall of portion 2 and an outlet orifice 35 through the wall of portion 4 adjacent web 3. The void between bearing 5 and retaining member 12 and portion 4 is filled with washers of wicking material 36 and 37 and packed wicking material 38.

Lubricant introduced into reservoir 33 may flow through orifice 35 to wick material 38 or into lining 32. In either case, it proceeds to the ends of bearing 5 by capillary action regardless of the attitude of the machine in space. When the shaft of the machine is rotated, lubricant is pumped from both ends of bearing 5 through the bearing to section 9 and through orifice 11 to washer 37.

It is clear that in machines built according to this construction lubrication will neither leak out of the machine nor will it leak into the other parts of the machine.

While there is illustrated and described a particular embodiment of this invention, modifications thereof will occur to those skilled in the art. I desire it to be understood, therefore, that this invention is not to be limited to the particular arrangement disclosed, and I intend in the appended claims to cover all modifications which do not depart from the spirit and scope of this invention.

What I claim as new and desire to secure by Letters Patent of the United States is:

1. A unit bearing structure having double flow lubrication comprising a frame with a cylindrical bearing member mounted therein, said bearing member having an orifice extending through its wall substantially at the midpoint thereof, a shaft rotatable in said bearing member having an intermediate undercut section formed therein adjacent said orifice and a pair of journal sections respectively flanking said undercut section, said journal sections respectively having oppositely spiraled pumping grooves cut in the surfaces thereof and respectively communicating from beyond both ends of said bearing into said undercut section, a casing of lubricant absorbing material surrounding said bearing member and respectively contacting the surfaces of said shaft beyond both ends of said bearing member so that lubricant applied to said casing proceeds to the ends of said bearing by capillary action and is pumped from said ends through said undercut section and said orifice to said casing.

2. A double flow lubricated unit bearing structure for a machine having a shaft comprising a frame having an outer cylindrical member and an inner cylindrical member provided with a bore, said outer and inner members being connected by an annular web, a cylindrical bearing member mounted within said inner member bore and spaced from said inner member defining an annular cavity, said bearing member having an orifice extending through its wall substantially at the midpoint thereof and communicating with said cavity, said shaft being rotatable within said bearing member and having an undercut section formed therein adjacent said orifice with a pair of journal sections respectively flanking said undercut section, said journal sections respectively having oppositely spiraled pumping grooves cut in the surfaces thereof and communicating into said undercut section from beyond both ends of said bearing member, lubricant absorbent material in said cavity enclosing said bearing member and respectively contacting the surfaces of said shaft beyond both ends of said bearing member whereby lubricant applied to said lubricant absorbent material flows to the ends of said bearing member by capillary action and is pumped through said undercut section and said orifice back to said lubricant absorbing material.

3. A double flow lubricated unit bearing structure for a machine having a shaft comprising a frame having an outer cylindrical member and an inner cylindrical member provided with a bore, said outer and inner members being connected together by an annular web, a cylindrical bearing member mounted in said inner member bore and spaced from said inner member defining an annular cavity, said bearing member having an orifice extending through the wall thereof communicating with said cavity, said shaft being rotatably supported within said bearing member and having an undrcut section formed therein and a pair of journal sections respectively flanking said undercut section, said journal sections respectively having oppositely spiraled pumping grooves formed therein respectively communicating from beyond both ends of said bearing member into said undercut section, an end plate secured to said frame closing said cavity and having an opening to receive said shaft, lubricant absorbing material in said cavity enclosing said bearing and respectively contacting the surfaces of said shaft beyond both ends of said bearing member, said material being secured against the open end of said cavity to form a lubricant reservoir therein, said reservoir being provided with inlet and outlet orifices in the inner and outer walls thereof adjacent said web, and a plug provided for closing said inlet orifice.

HARL C. BRADLEY.

REFERENCES CITED

The following references are of record in the file of this patent:

UNITED STATES PATENTS

| Number | Name | Date |
|---|---|---|
| 954,836 | Wheaton | Apr. 12, 1910 |
| 2,226,622 | Lignian | Dec. 31, 1940 |